(12) United States Patent
Kim et al.

(10) Patent No.: US 8,355,743 B2
(45) Date of Patent: Jan. 15, 2013

(54) PUSH-TO-TALK COMMUNICATION METHOD AND SYSTEM

(75) Inventors: Bo Sung Kim, Gumi-si (KR); Seung Woo Park, Seongnam-si (KR); Chang Hyun Chun, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 774 days.

(21) Appl. No.: 12/170,835

(22) Filed: Jul. 10, 2008

(65) Prior Publication Data

US 2009/0054097 A1 Feb. 26, 2009

(30) Foreign Application Priority Data

Aug. 20, 2007 (KR) .................. 10-2007-0083270

(51) Int. Cl.
*H04B 7/00* (2006.01)
(52) U.S. Cl. ........ 455/517; 455/518; 455/519; 455/520; 709/204; 709/205; 709/206
(58) Field of Classification Search .......... 455/517–520, 455/416; 709/204–206
See application file for complete search history.

(56) References Cited

U.S. PATENT DOCUMENTS

| 2005/0058125 A1* | 3/2005 | Mutikainen et al. .......... 370/354 |
| 2007/0130259 A1* | 6/2007 | Daniell et al. ................ 709/204 |
| 2008/0233990 A1* | 9/2008 | Jen ............................... 455/518 |

* cited by examiner

*Primary Examiner* — Fayyaz Alam
(74) *Attorney, Agent, or Firm* — The Farrell Law Firm, P.C.

(57) ABSTRACT

In a Push-To-Talk (PTT) communication method, during a PTT conversation between multiple mobile terminals in a PTT chat-room, a first mobile terminal specifies a second mobile terminal as a target for a forced leave and makes a request to a PTT server for a forced leave of the second mobile terminal. The PTT server forces the second mobile terminal to leave the PTT chat-room. During a PTT chat-room conversation, a disruptive member can be forced to leave the PTT chat room and is not allowed to later re-join the PTT chat room. Thus, it is possible to more smoothly run a PTT chat room in a manner fitting for the purpose, enhancing user convenience.

22 Claims, 14 Drawing Sheets

PUSH-TO-TALK COMMUNICATION METHOD AND SYSTEM

PRIORITY

This application claims priority to an application entitled "PUSH-TO-TALK COMMUNICATION METHOD AND SYSTEM" filed in the Korean Intellectual Property Office on Aug. 20, 2007 and assigned Serial No. 2007-0083270, the contents of which are incorporated herein by reference.

BACKGROUND OF THE INVENTION

1. Field of the Invention

The present invention relates generally to push-to-talk (PTT) communication and, more particularly, to a PTT communication method and system that provides an effective means to force a particular member to leave a PTT chat room in a PTT communication mode.

2. Description of the Related Art

In general, a mobile communication system divides its entire service area into smaller service regions known as cells, which are managed by corresponding Base Stations (BSs). These base stations are then centrally managed by Mobile Switching Centers (MSCs) to enable subscribers to place a call while traveling between cells.

With advances in communication technologies, various techniques have been developed to combine Internet Protocol (IP) networks with mobile communication networks. Voice over IP (VoIP) technology is such an example, which provides a packet-based voice service using Internet protocols.

In a packet-based voice service, establishment of a call is performed through both a mobile communication network and an IP network, and thus requires a relatively long call setup time. Nevertheless, the packet-based voice technology can provide interactive call services such as group calls and private calls using multicast communication over IP networks. Here, an interactive call denotes a walkie-talkie style call, which is made according to interactions between users, in PTT communication. A group call is a conference call between a group of members, and a private call is a call between two members.

For PTT communication, a logged user selects a group of friends or peers, or another person to be called in a member list displayed on the mobile terminal, and presses the PTT button. Then, a path for one-to-one or group communication is established in a network to provide a PTT communication service. A need has recently developed for service diversity in PTT communication.

SUMMARY OF THE INVENTION

The present invention has been made in view of the above need in the art, and the present invention provides a PTT communication method and system that can force a particular member to leave a PTT chat room during PTT communication.

The present invention also provides a PTT communication method and system that can force a member specified by the room chair to immediately leave a PTT chat room during PTT communication.

The present invention further provides a PTT communication method and system that can force a member specified by a majority vote under majority rule to leave a PTT chat room during PTT communication.

In accordance with the present invention, there is provided a PTT communication method including having, by multiple mobile terminals, a PTT conversation with each other in a PTT chat-room, making, by a first mobile terminal after specifying a second mobile terminal as a target for a forced leave, a request to a PTT server for a forced leave of the second mobile terminal, and forcing, by the PTT server, the second mobile terminal to leave the PTT chat-room.

In accordance with the present invention, there is provided a PTT communication system including a plurality of mobile terminals including a first mobile terminal making a PTT chat room for a PTT conversation and a second mobile terminal specified as a target for a forced leave, and a PTT server forcing, upon reception of a request from the first mobile terminal for a forced leave of the second mobile terminal, the second mobile terminal to leave the PTT chat-room.

In the present invention, a member with disruptive behavior to a PTT chat room can be forced to leave the PTT chat room during PTT communication. Thus, it is possible to more smoothly run a PTT chat room in a manner fitting for the purpose, enhancing user convenience.

BRIEF DESCRIPTION OF THE DRAWINGS

The features and advantages of the present invention will be more apparent from the following detailed description in conjunction with the accompanying drawings, in which.

DETAILED DESCRIPTION OF THE PREFERRED EMBODIMENTS

Hereinafter, preferred embodiments of the present invention are described in detail with reference to the accompanying drawings. The same reference symbols are used throughout the drawings to refer to the same or like parts. Detailed descriptions of well-known functions and structures incorporated herein have been omitted for the sake of clarity and conciseness.

In a "PTT chat-room mode", users of mobile terminals registered in the same chat room can place and receive voice calls through PTT communication. A PTT chat room can be made by the user of a particular mobile terminal or a PTT server. In some cases, only users of mobile terminals pre-registered in a group may be admitted to a PTT chat room, and an alarm message can be transmitted to mobile terminals not participating in the PTT chat room. During a conversation at a PTT chat room, a mobile terminal may invite another mobile terminal to the PTT chat room, and may check states of other mobile terminals (e.g., wait mode, floor holder or log-off).

For the purpose of description, a mobile terminal is described herein by way of example, and the present invention is not limited thereto. The mobile terminal of the present invention is a PTT-enabled device for user convenience, and may be any information and communication appliance or multimedia appliance, such as a mobile communication terminal, mobile phone, wired/wireless telephone, portable multimedia player, personal digital assistant or smart phone.

Figure 1:
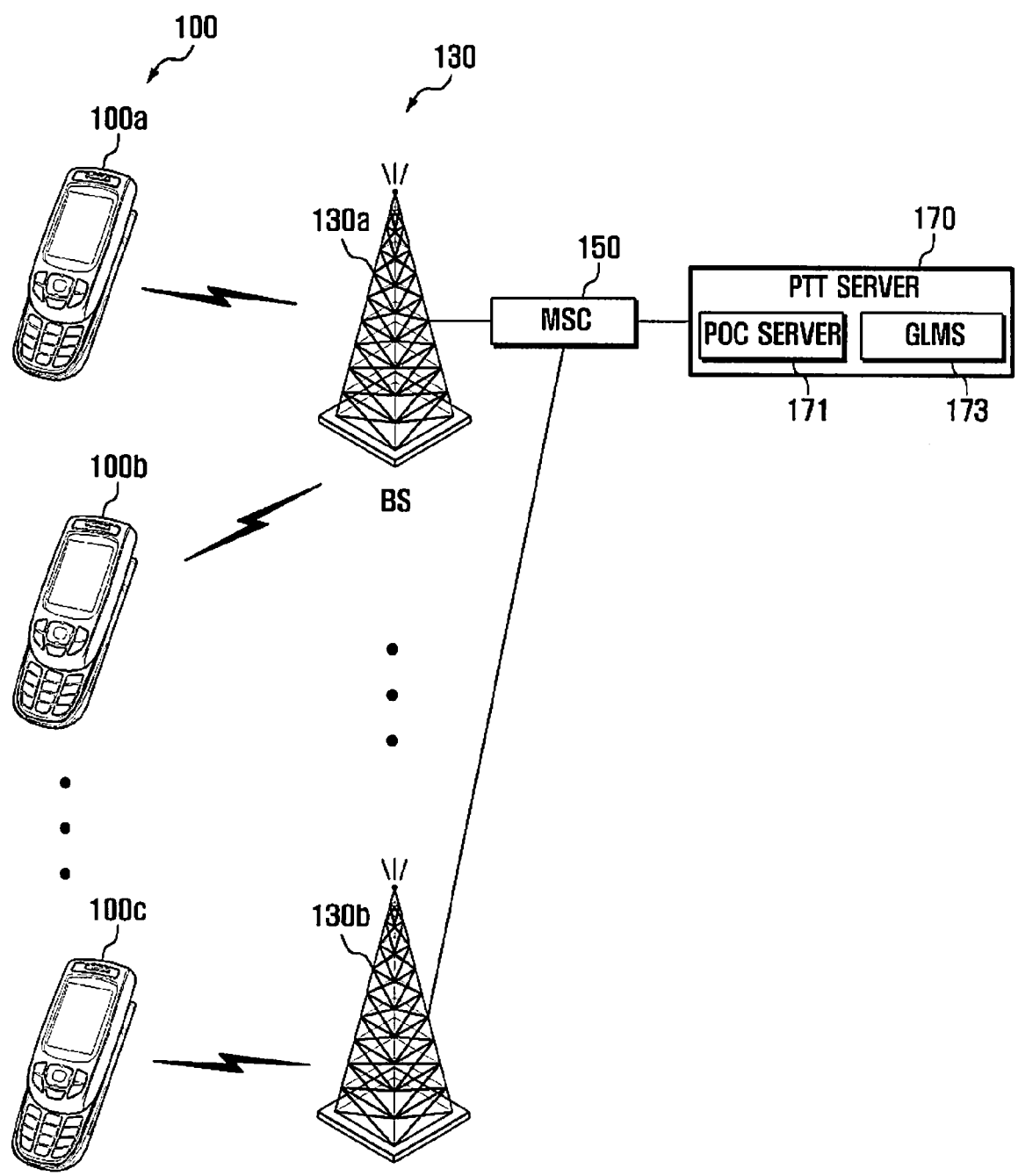
FIG. 1 illustrates a PTT communication system including mobile terminals and a PTT server according to the present invention.

FIG. 1 illustrates a PTT communication system including mobile terminals and a PTT server according to the present invention.

Referring to FIG. 1, the PTT communication system includes a plurality of mobile terminals 100a, 100b and 100c, a plurality of BSs 130a and 130b, an MSC 150 and a PTT server 170.

The mobile terminal 100 can use a voice call service, short message service and multimedia message service. The mobile terminal 100 can include a camera module for taking a picture of a target object, and an MPEG Layer Audio 3 (MP3) player for music playback, according to a user request.

In particular, the mobile terminal 100 includes a PTT button, and can perform PTT communication, for example, in a PTT chat-room mode in response to input of the PTT button. The mobile terminal 100 includes a PTT module to handle PTT-related operations such as sending a PTT chat-room request to the PTT server 170.

For a PTT chat-room conversation, the mobile terminal 100 sends a PTT communication request in a preset format to a corresponding base station 130. The mobile terminal 100 can connect to the PTT server 170, and update (add, change, or delete) group list information and personal information set by the user. For example, the mobile terminal 100 can change a group list set in a particular PTT chat room, and can update members registered in individual groups.

A BS 130 is connected to the MSC 150, which is then connected through a data network to the PTT server 170. The MSC 150 receives a PTT chat-room request from a mobile terminal 100 through a BS 130, and forwards the received request to the PTT server 170. The MSC 150 has an Inter-Working Function (IWF) together with the PTT server 170 to process data packets including PTT communication requests.

The PTT server 170 manages a PTT user group in real time. That is, the PTT server 170 performs overall control of a PTT user group, arbitrates requests for PTT chat-room conversation and maintains PTT communication, distributes registration lists to users, and establishes and releases calls using system and network resources. The PTT server 170 can grant the floor to one of currently connected mobile terminals 100.

In addition, the PTT server 170 includes a Push-to-talk over Cellular (PoC) server 171 and a Group and List Management Server (GLMS) 173. The PoC server 171 performs communication to provide PTT services over a mobile communication network, and the GLMS 173 manages information on PTT users and lists of user groups, such as group lists set in individual PTT chat rooms.

Figure 2A:
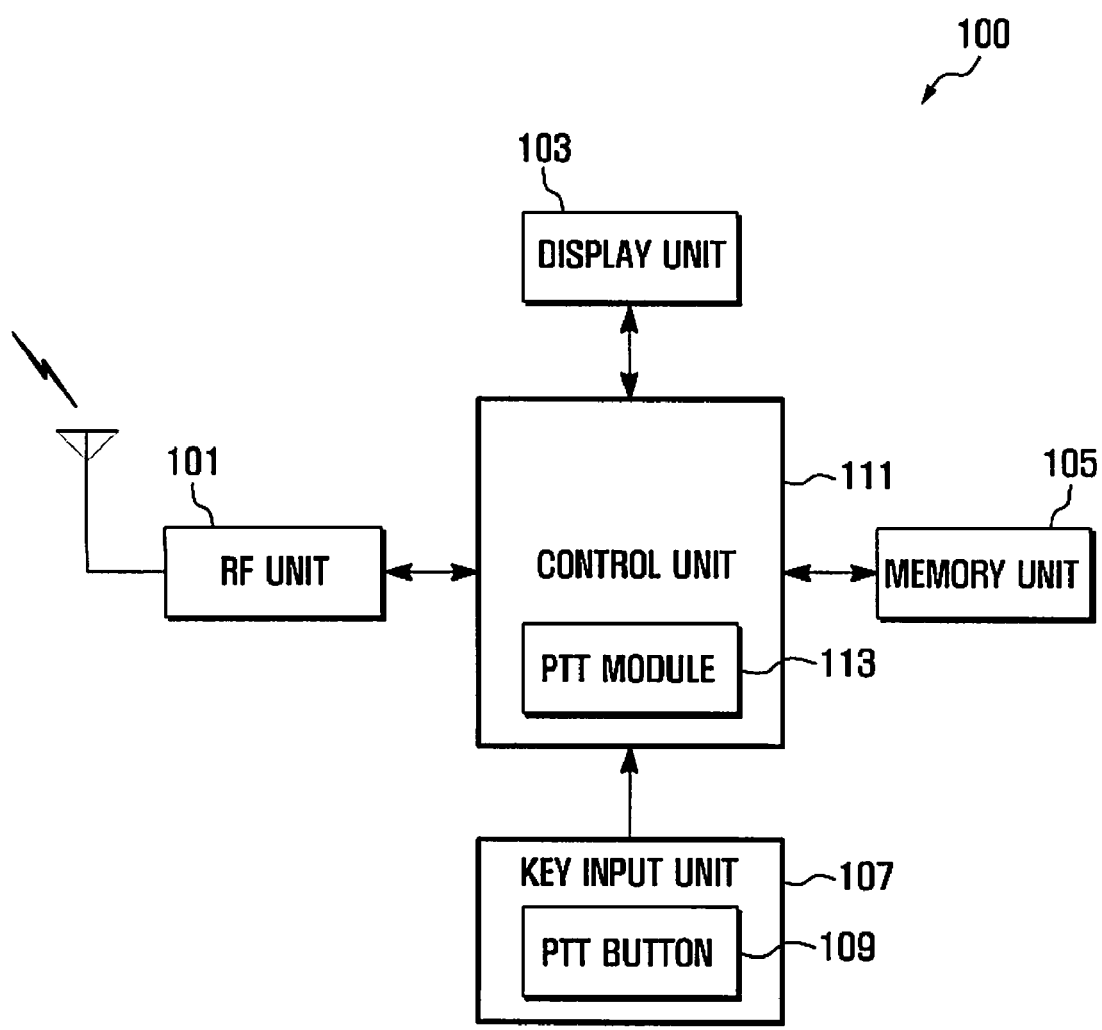
FIG. 2A illustrates a PTT-enabled mobile terminal in accordance with the present invention.

FIG. 2A illustrates a PTT-enabled mobile terminal 100 according to the present invention.

Referring to FIG. 2A, the mobile terminal 100 includes a Radio Frequency (RF) unit 101, display unit 103, memory unit 105, key input unit 107 and control unit 111.

The RF unit 101 performs wireless communication for the mobile terminal 100. The RF unit 101 includes an RF transmitter for up-converting the frequency of a signal to be transmitted and amplifying the signal, and an RF receiver for low-noise amplifying a received signal and down-converting the frequency of the received signal.

The RF unit 101 initiates an operation and processes PTT data for a PTT service, according to a user manipulation signal from a PTT button 109. For example, in response to input of the PTT button 109, the RF unit 101 awaits reception of PTT data, and sends a user speech signal from a microphone.

The display unit 103 displays various information related to operation modes and states of the mobile terminal 100. The display unit 103 may include a panel of Liquid Crystal Display (LCD) devices and an LCD controller for controlling the LCD devices. If the panel has a touch screen capability, the display unit 103 can act as an input means.

In particular, the display unit 103 displays a list of members registered for PTT communication. During a PTT chat-room mode, the display unit 103 displays a list of members being in conversation and the state of each member (e.g., wait mode, floor holder or log-off). When a specified member is forced to leave the chat room, the display unit 103 can display a popup message notifying forced leave of the specified member. When a key is input to force a particular member to leave the chat room during the PTT chat-room mode, the display unit 103 displays a list of members who are in conversation.

The memory unit 105 stores programs and information necessary for the operation of the mobile terminal 100. In particular, the memory unit 105 can store a list of groups for PTT chat room conversation and a list of members in groups. The group list and member list can also be received from the PTT server 170. The memory unit 105 stores information on a member forced to leave such as a phone number or login address for PTT communication.

The key input unit 107 receives a manipulation signal from the user to control the operation of the mobile terminal 100. In particular, the key input unit 107 includes a PTT button 109, which sends a manipulation signal for PTT service utilization from the user to the control unit 111. The PTT button may be installed as a special key at the mobile terminal 100 or may be one of a plurality of keys in the key input unit 107. The key input unit 107 is used to send a request for a PTT chat-room conversation, select a counterpart for the PTT chat-room conversation, specify a person to be forced to leave during the PTT chat-room conversation, and terminate the PTT chat-room conversation.

The control unit 111 controls the overall operation of the mobile terminal 100. In particular, the control unit 111 controls a function of the mobile terminal 100 for PTT chat-room conversation. The control unit 111 includes a PTT module 113. In response to input of the PTT button 109 for a PTT chat-room conversation, the control unit 111 controls the PTT module 113 to send a connection request for a PTT chat-room conversation to the PTT server 170.

The control unit 111 sets a decision scheme for a forced leave before initiation of a PTT chat-room conversation. The decision on a forced leave may be made by the authority of a room chair, by majority rule, for example-. If necessary, the control unit 111 forces a specified member to leave the PTT chat room according to the set decision scheme during a PTT chat-room conversation, and may store information on the member placed on a forced leave. Later, when a member placed on a forced leave requests a PTT chat-room conversation, the control unit 111 can reject the request.

In the above description, to process a function related to a PTT service, the PTT module 113 is included in the control unit 111. However, the present invention is not limited thereto. That is, the PTT module 113 may also be included in the mobile terminal 100 as a separate entity from the control unit 111.

Figure 2B:
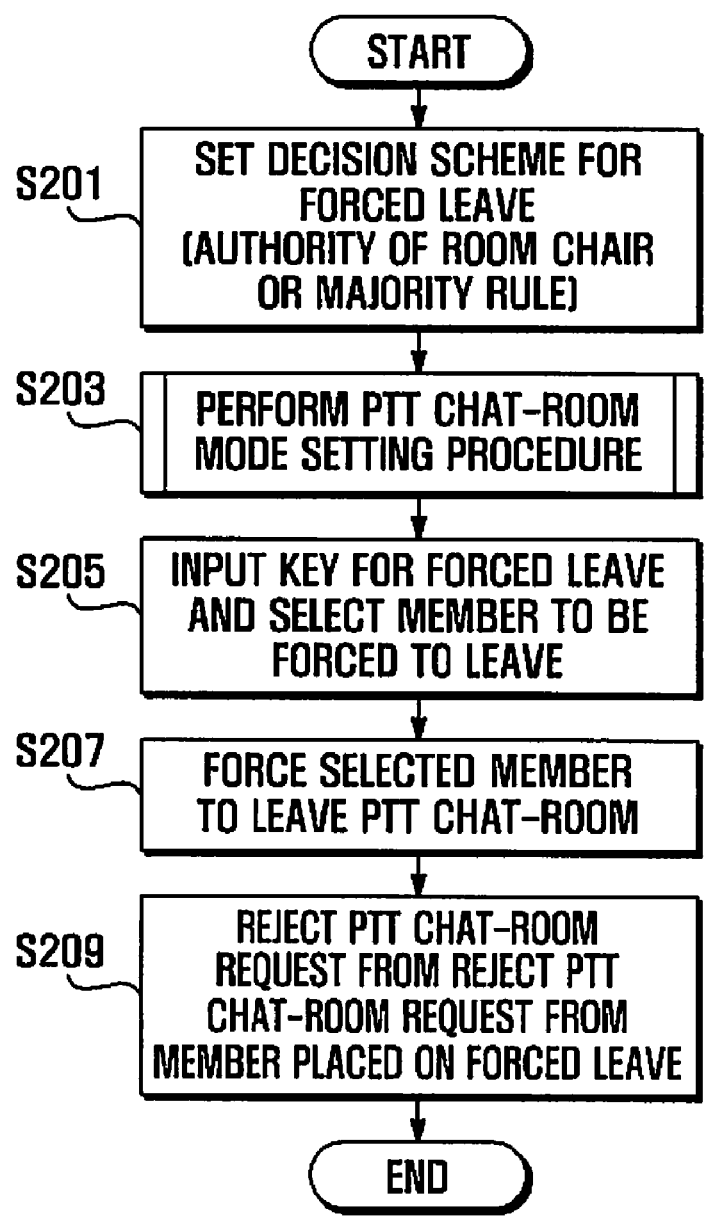
FIG. 2B illustrates a PTT communication method according to the present invention.
Figure 3A:
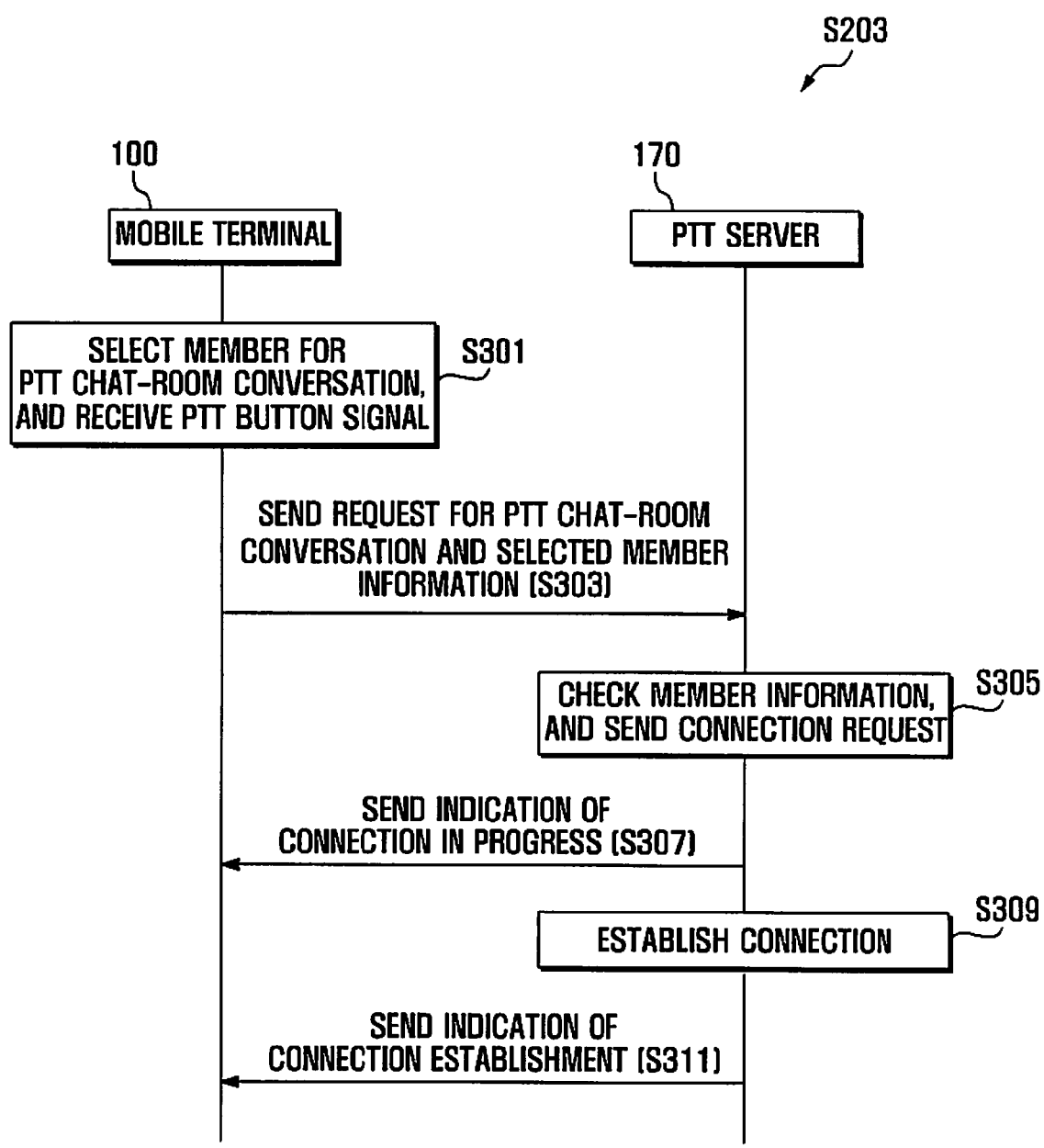
FIGS. 3A and 3B are sequence diagrams illustrating a procedure for setting a PTT chat-room mode in the PTT communication method of FIG. 2B.
Figure 3B:
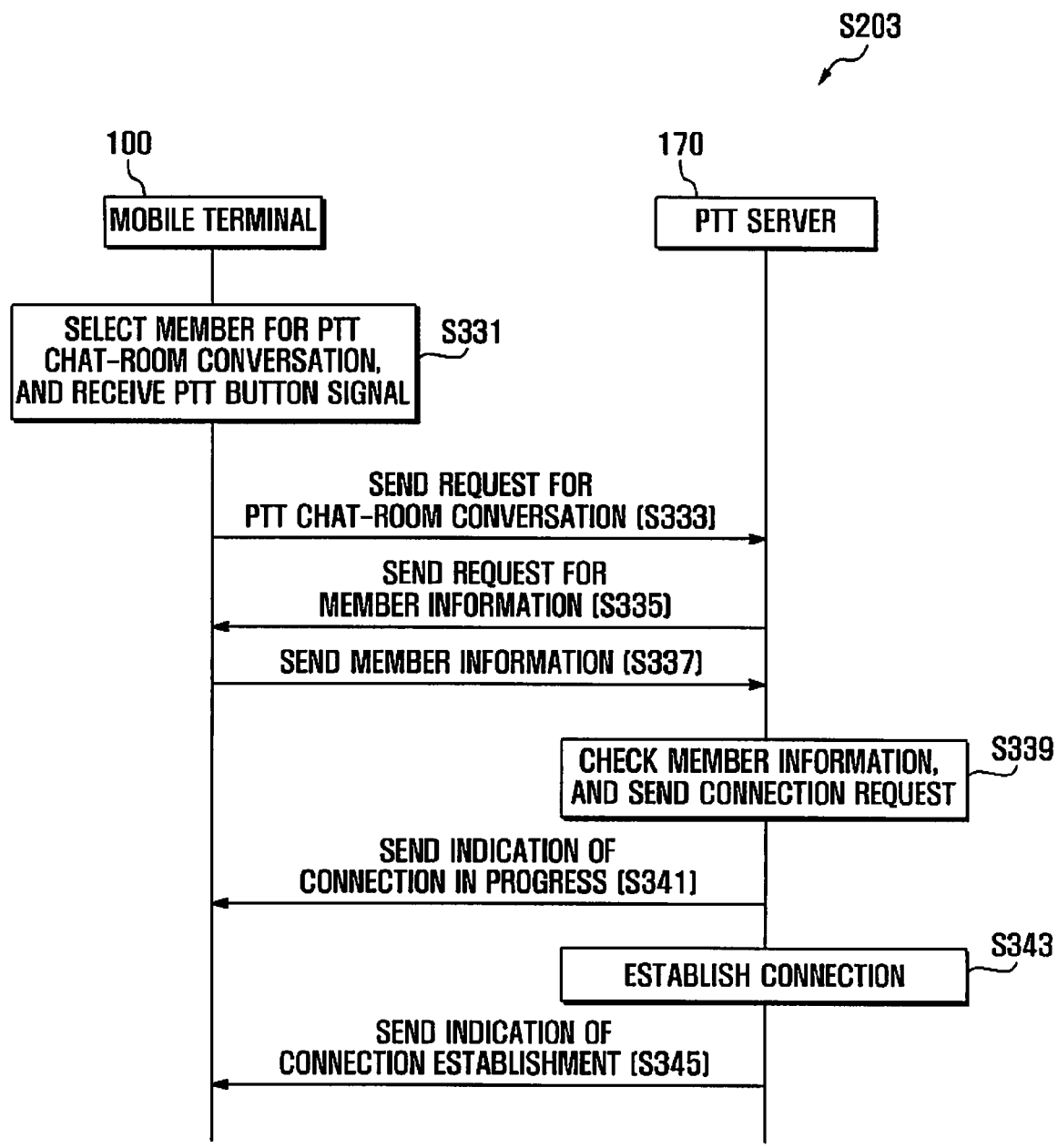

FIG. 2B illustrates a PTT communication method according to the present invention. FIGS. 3A and 3B are sequence diagrams illustrating a procedure for a PTT chat-room mode in the method of FIG. 2B.

Figure 4A:
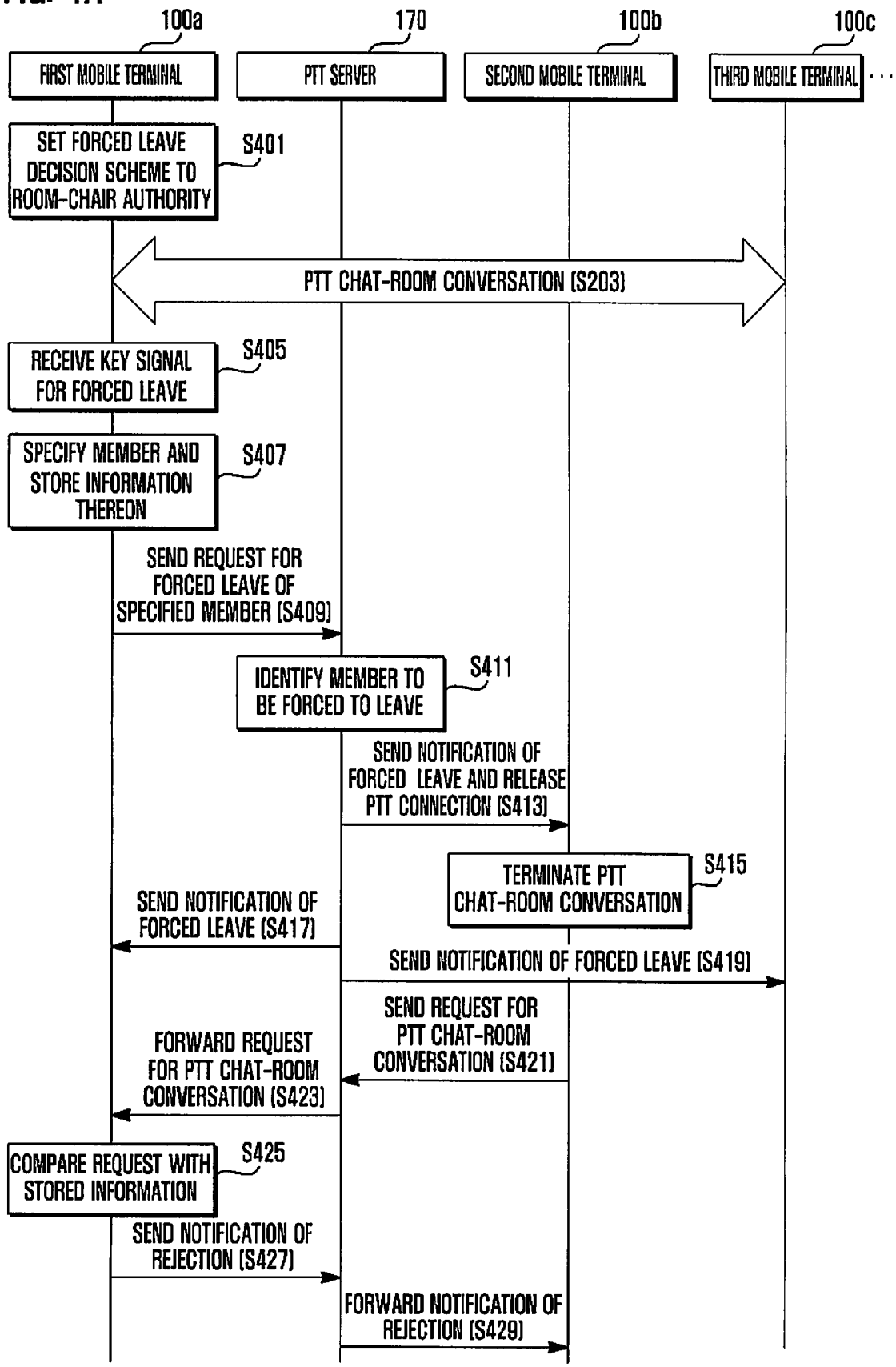
FIG. 4A is a sequence diagram illustrating a first embodiment of the PTT communication method of FIG. 2B.
Figure 4B:
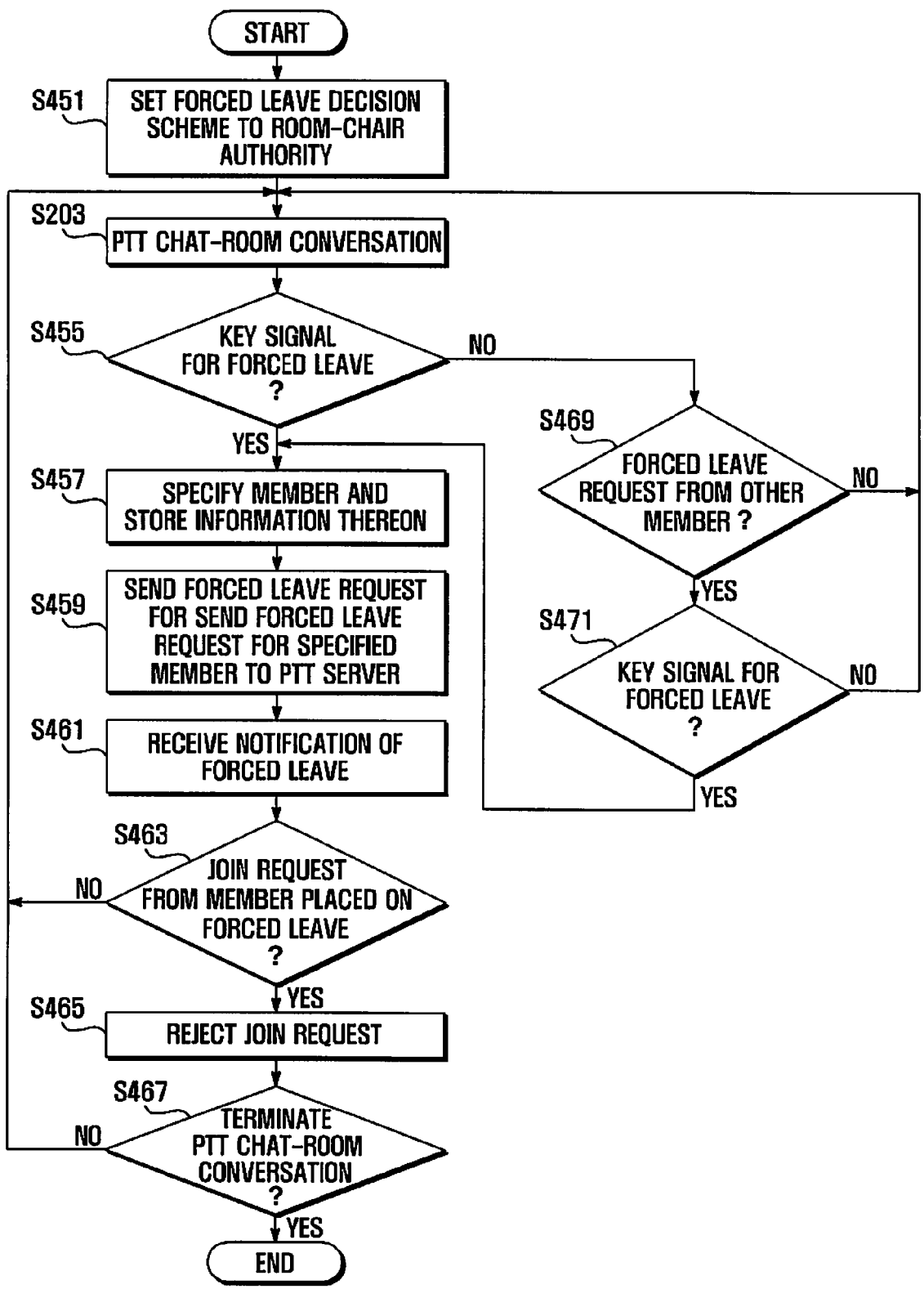
FIG. 4B illustrates operations of a mobile terminal for the communication in FIG. 4A.
Figure 5:
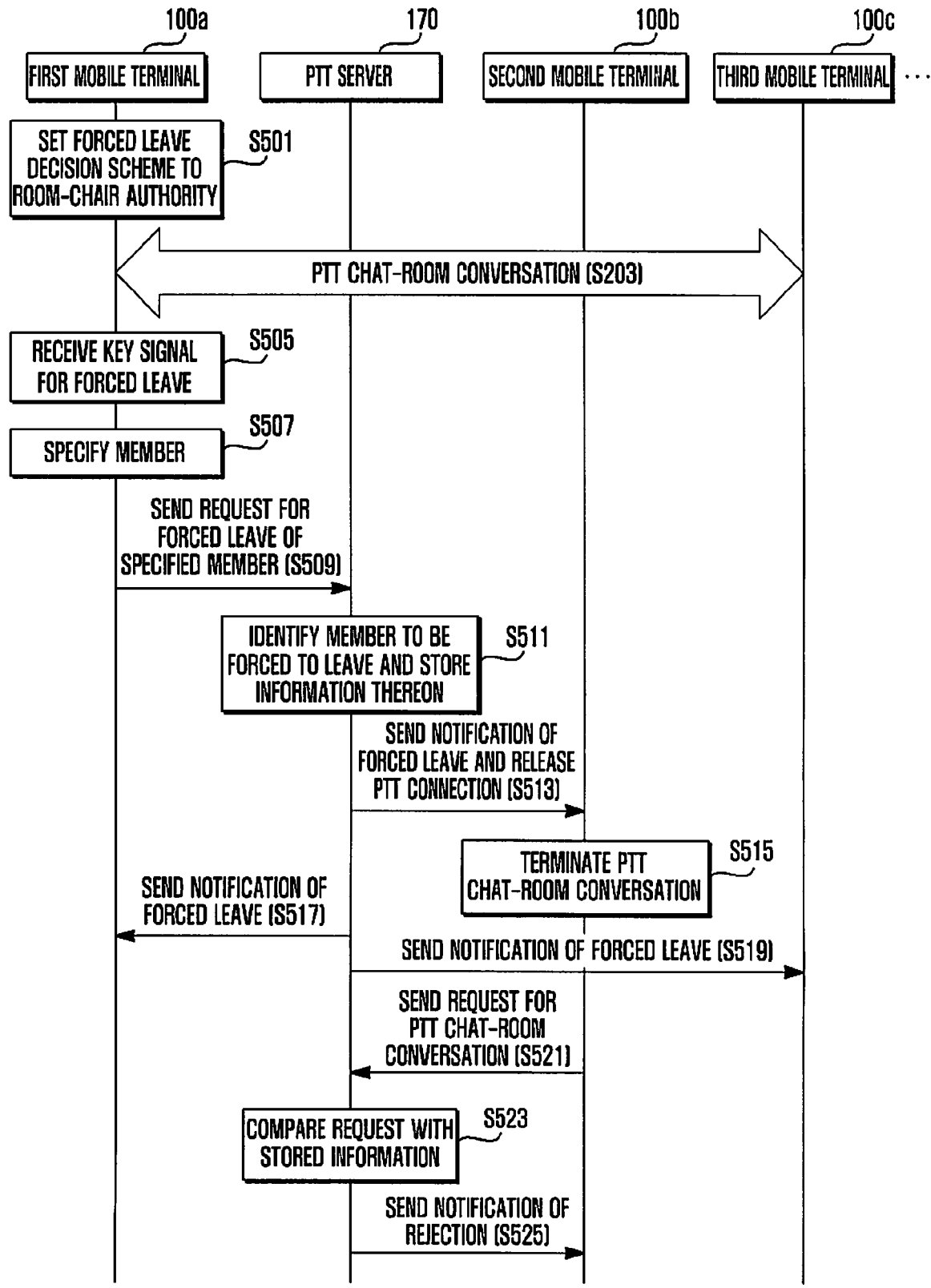
FIG. 5 is a sequence diagram illustrating a second embodiment of the PTT communication method of FIG. 2B.
Figure 6A:
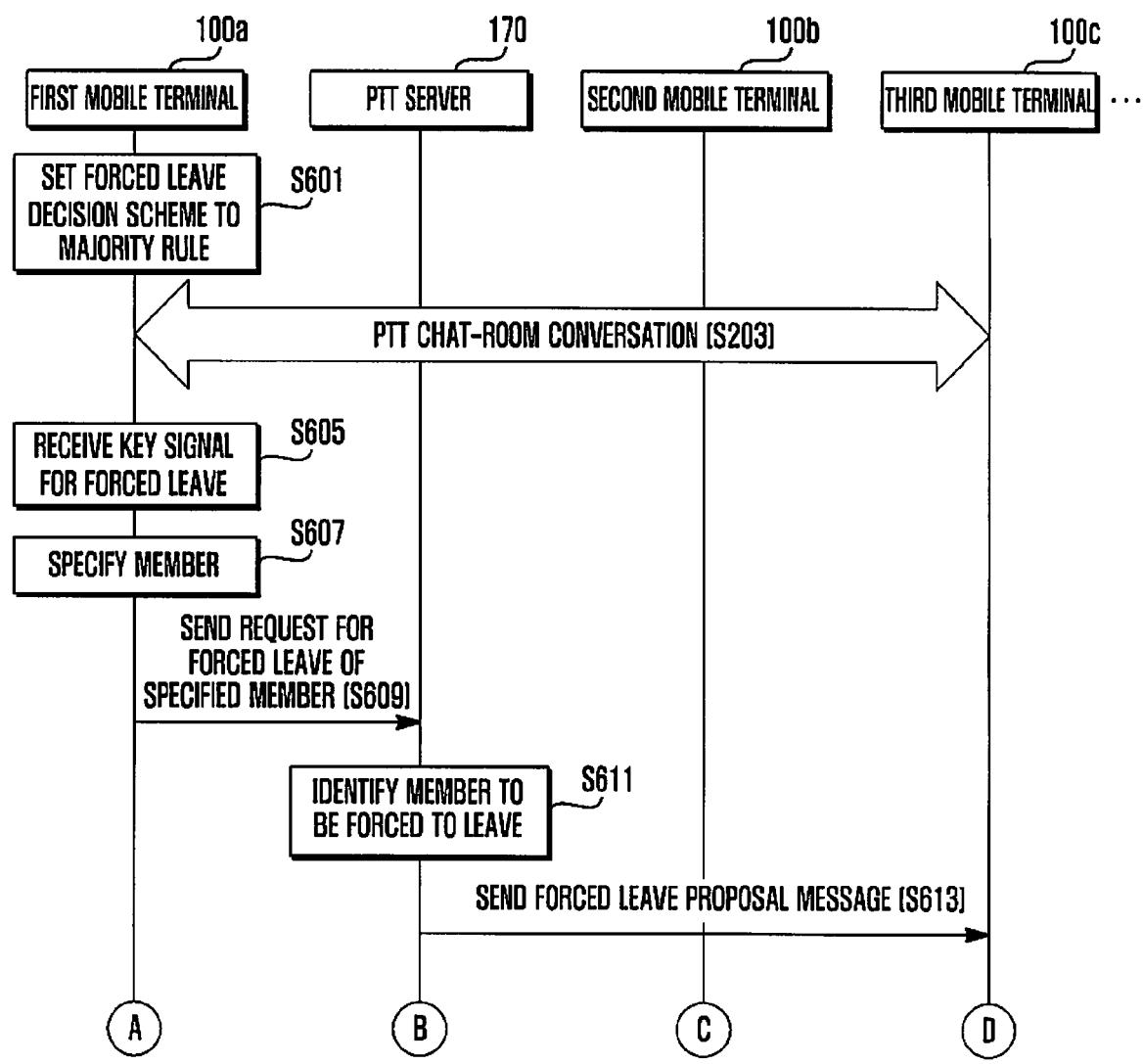
FIGS. 6A to 6B are sequence diagrams illustrating a third embodiment of the PTT communication method of FIG. 2B.
Figure 6B:
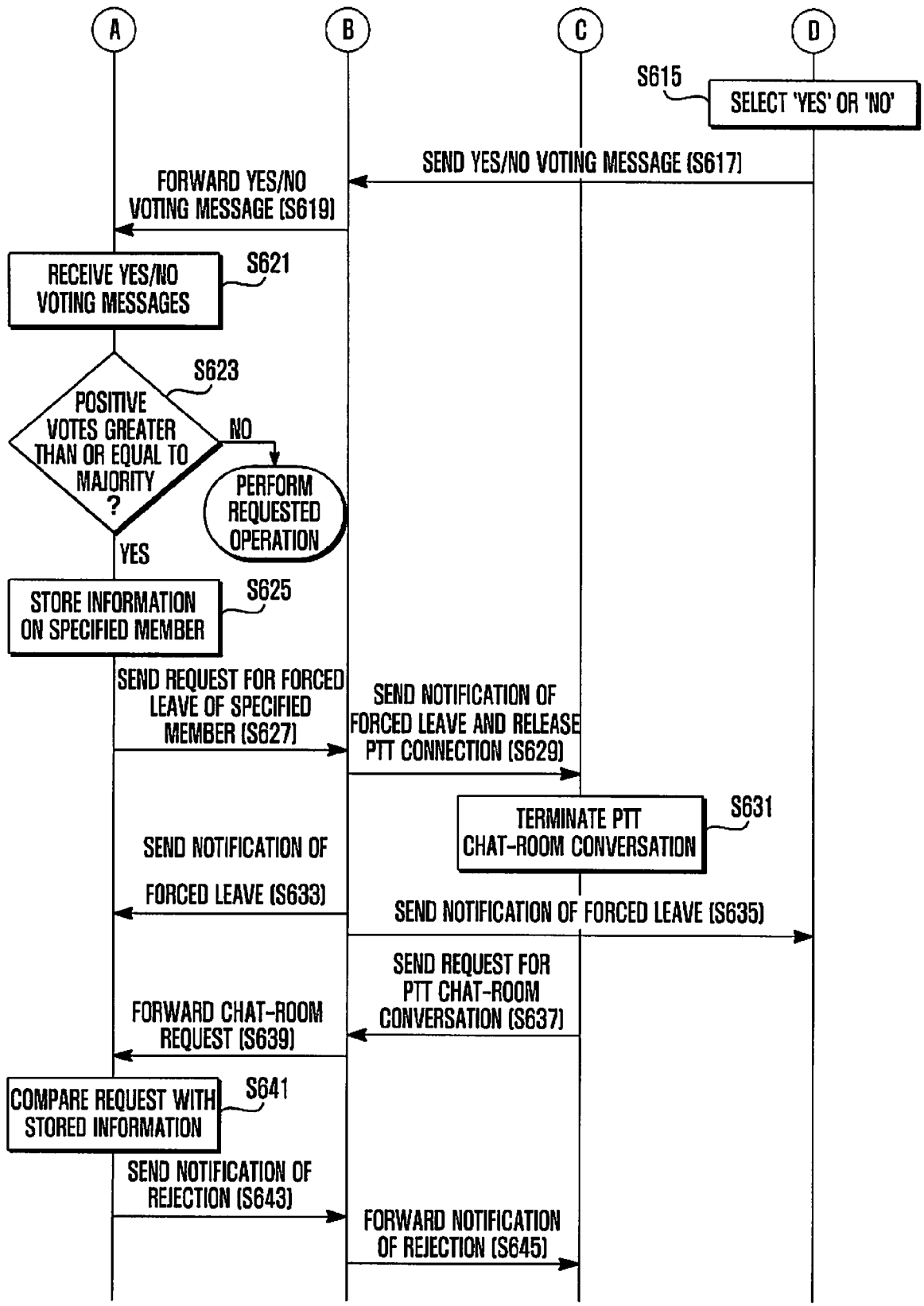

Referring to FIGS. 1, 2A and 2B, the control unit 111 of the mobile terminal 100 sets a decision scheme for a forced leave in step S201. Here, the decision on a forced leave may be made by the authority of a room chair or by majority rule. Procedures of FIGS. 4A, 4B and 5 are related to a forced leave decision made by the authority of a room chair, and procedures of FIGS. 6A, 6B and 7 are related to a forced leave decision made by majority rule.

Thereafter, the control unit 111 performs a procedure to set a PTT chat-room mode in step S203 in the manner illustrated in FIGS. 3A and 3B.

Referring to FIG. 3A, the control unit 111 selects a member for a PTT chat-room conversation and receives a signal from the PTT button 109 (S301). The user selects a member identifier in a member list stored in the memory unit 105 and presses the PTT button 109 for a PTT chat-room conversation.

The control unit 111 controls the PTT module 113 to send a request for a PTT chat-room conversation and information on the selected member to the PTT server 170 (S303). The control unit 111 places a highlight on the selected member identifier during display of the stored member list.

The PTT server 170 checks the selected member information and sends a connection request to a mobile terminal of the selected member (S305). The PTT server 170 checks validity of the received member information and whether the mobile terminal of the selected member is turned on. The PTT server 170 sends an indication of connection in progress to the mobile terminal 100 (S307). That is, the PTT server 170 notifies the mobile terminal 100 of sending a connection request to the mobile terminal of the selected member, and the mobile terminal 100 displays on the display unit 103 an indication of a connection attempt by the PTT server 170.

When the connection is established (S309), the PTT server 170 sends an indication of connection establishment to the mobile terminal 100 (S311). Accordingly, the PTT chat-room mode is set.

The procedure of FIG. 3B is similar to that of FIG. 3A, and describes a case where information on a selected member is not sent together with a request for a PTT chat-room conversation. Referring to FIG. 3B, the control unit 111 selects a member for a PTT chat-room conversation and receives a signal from the PTT button 109 (S331).

The control unit 111 controls the PTT module 113 to send a request for a PTT chat-room conversation to the PTT server 170 (S333). At this step, the control unit 111 does not send the information on the selected member, unlike in FIG. 3A.

Upon reception of the request for a PTT chat-room conversation, the PTT server 170 sends a request for information on the selected member to the mobile terminal 100 (S335).

In return, the mobile terminal 100 sends information on the selected member to the PTT server 170 (S337). If information on the selected member is not present, the mobile terminal 100 informs the PTT server 170 of absence of the information.

The PTT server 170 checks the selected member information and sends a connection request to a mobile terminal of the selected member (S339). The PTT server 170 sends an indication of connection in progress to the mobile terminal 100 (S341).

When the connection is established (S343), the PTT server 170 sends an indication of connection establishment to the mobile terminal 100 (S345). Accordingly, the PTT chat-room mode is set.

The PTT chat-room mode may be set using a procedure other than those of FIGS. 3A and 3B. For example, the mobile terminal 100 selects identifiers of members for a PTT chat-room conversation from a member list stored in the memory unit 105, and sends the member information to the PTT server 170, which then stores the received member information. Thereafter, when the mobile terminal 100 selects a member and receives a signal from the PTT button 109 for a PTT chat-room conversation, the PTT server 170 sends a connection request to a mobile terminal of the selected member using the stored member information and establishes a connection for the PTT chat-room conversation.

Referring back to FIG. 2B, during the PTT chat-room mode, the control unit 111 receives a signal from a key for a forced leave, and specifies a member to be forced to leave in step S205.

During the PTT chat-room mode, the user can force a disruptive member to leave the PTT chat-room for more smoothly running the PTT chat room in a manner fitting for the purpose. Thereto, the user can input a preset key such as a '*' key or '#' key, or select a menu item related to a forced leave through an option key. In response to input of the preset key, the control unit 111 displays identifiers of those members currently in the PTT chat-room conversation on the display unit 103. The user selects one of the displayed member identifiers for a forced leave.

The control unit 111 forces the specified member to leave the PTT chat room according to the set decision scheme in step S207. This step is described later in detail with respect to first to fourth embodiments.

When a member placed on a forced leave requests a PTT chat-room conversation, the control unit 111 rejects the request in step S209. The PTT server 170 may also reject a request for a PTT chat-room conversation from a member placed on a forced leave. The control unit 111 or the PTT server 170 may store information on a member placed on a forced leave, and reject a request for a PTT chat-room conversation from the member placed on a forced leave. Other schemes may also be used.

FIG. 4A is a sequence diagram illustrating a first embodiment of the PTT communication method of FIG. 2B, and FIG. 4B illustrates operations of a mobile terminal for the communication in FIG. 4A.

Referring to FIGS. 1, 2A, 2B, 4A and 4B, the first embodiment of the PTT communication method is described in connection with the PTT system including mobile terminals and PTT server 170. In this embodiment, a first mobile terminal 100a is a terminal creating a PTT chat room with the authority of a room chair.

Referring to FIG. 4A, the control unit 111 of the first mobile terminal 100a sets a decision scheme for a forced leave to room-chair authority (S401). The first mobile terminal 100a with room-chair authority is permitted to specify one of members in PTT conversation and force the specified member to leave the PTT chat room.

During PTT conversation between mobile terminals in the PTT chat-room mode (S203), the control unit 111 of the first mobile terminal 100a receives a key signal for a forced leave (S405).

The control unit 111 of the first mobile terminal 100a receives a signal specifying a member, for example, a second mobile terminal 100b, and stores information on the second mobile terminal 100b (S407). The control unit 111 of the first mobile terminal 100a controls the PTT module 113 to send a request for a forced leave of the specified member to the PTT server 170 (S409).

The PTT server 170 identifies a mobile terminal to be forced to leave according to the forced leave request (S411), and notifies the second mobile terminal 100b of a forced leave and releases the PTT connection to the second mobile terminal 100b (S413). Thereby, the second mobile terminal 100b terminates the PTT chat-room conversation (S415).

At step S413, in response to a forced leave request from the first mobile terminal 100a, the PTT server 170 immediately releases the PTT connection to the second mobile terminal 100b. Alternatively, the PTT server 170 may send a warning message of a forced leave to the second mobile terminal 100b a preset number of times before releasing the PTT connection thereto.

The PTT server 170 sends a notification of a forced leave of the second mobile terminal 100b to other mobile terminals 100a and 100c in PTT chat-room conversation (S417 and S419, respectively).

Later, when the second mobile terminal 100b placed on a forced leave sends a request for a PTT chat-room conversation to the PTT server 170 (S421), the PTT server 170 sends a notification of the request made by the second mobile terminal 100b to the first mobile terminal 100a (S423).

The control unit 111 of the first mobile terminal 100a compares the information regarding the second mobile terminal 100b requesting a PTT chat-room conversation with stored information regarding a mobile terminal placed on a forced leave (S425).

Through the comparison, the control unit 111 of the first mobile terminal 100a recognizes that the second mobile terminal 100b has been placed on a forced leave, and sends a notification of rejecting the request from the second mobile terminal 100b to the PTT server 170 (S427). The PTT server 170 forwards the notification of rejection to the second mobile terminal 100b (S429).

Next, referring to FIG. 4B, the operation of the first mobile terminal 100a with room-chair authority is described in more detail. The control unit 111 of the first mobile terminal 100a sets a decision scheme for a forced leave to room-chair authority in step S451. The user may set the decision scheme by selecting an item related to room-chair authority in a chat-room menu for a PTT service.

The control unit 111 sets a PTT chat-room mode in a previously described manner in step S203.

During PTT conversation in the PTT chat-room mode, the control unit 111 checks whether a key signal for a forced leave is received in step S455. The user may input a special key to force a member to leave the PTT chat room.

If a key signal for a forced leave is received, the control unit 111 receives a signal specifying a member and stores information on the specified member in step S457. In response to input of the preset key, the control unit 111 displays a list of members currently in the PTT chat-room conversation on the display unit 103. The user selects a member to be forced to leave in the displayed member list. The control unit 111 stores information on the selected member such as a mobile phone number or registered address in the memory unit 105.

The control unit 111 sends a request for a forced leave of the specified member to the PTT server 170 in step S459. The PTT server 170 releases the PTT connection to the specified member in a manner described above.

The control unit 111 receives a notification of a forced leave of the specified member and displays the received notification on the display unit 103 in step S461.

When a member placed on a forced leave makes a join request in step S463, the control unit 111 rejects the join request in step S465.

When a termination request for the PTT chat-room conversation is issued in step S467, the control unit 111 terminates the PTT chat-room conversation. Termination of the PTT chat-room conversation can be performed as follows.

When the user of a mobile terminal 100 with room-chair authority desires to terminate a PTT chat-room conversation, the user selects a menu item for termination of the PTT chat-room conversation from a provided menu using an option key during the PTT chat-room mode. The control unit 111 of the mobile terminal 100 sends a request for termination of the PTT chat-room conversation to the PTT server 170. The PTT server 170 receives the termination request, and terminates the PTT chat-room conversation if the termination request is issued by a user with room-chair authority and the PTT chat-room conversation allows immediate termination.

The PTT server 170 terminates the PTT chat-room conversation when a preset duration for the PTT chat-room conversation has expired, or when a request for termination of the PTT chat-room conversation is received from a user with room-chair authority.

If a key signal for a forced leave is not received at step S455, the control unit 111 checks whether a request for a forced leave is received from another member in step S469. At step S451, the decision scheme is set so as to vest the room chair with authority to make a decision on a forced leave. Hence, the room chair has the authority to force a particular member to leave. Other members in PTT chat-room conversation may request the room chair to force a specified member to leave the chat room.

If a request for a forced leave is received from another member, the control unit 111 checks whether a preset key signal is input in step S471. If a preset key signal is input, the control unit 111 proceeds to step S457 to force a specified member to leave the PTT chat room. If a preset key signal is not input, the control unit 111 ignores the forced leave request.

As described above, the room chair can force a disruptive member to leave a PTT chat room, and reject a join request from a member placed on a forced leave. Thus, it is possible to more smoothly run a PTT chat room in a manner fitting for the purpose.

Next, a second embodiment of the PTT communication method is described. Descriptions of elements the same as or corresponding to those of the first embodiment are omitted. FIG. 5 is a sequence diagram illustrating a second embodiment of the PTT communication method.

The second embodiment of the method is similar to the first embodiment, but some steps performed by the mobile terminal 100 in the first embodiment are performed by the PTT server 170 in the second embodiment. In the second embodiment, a first mobile terminal 100a creates a PTT chat room with the authority of a room chair.

Referring to FIGS. 1, 2A and 5, the second embodiment of the PTT communication method is described in connection with the PTT system including mobile terminals and PTT server 170. Referring to FIG. 5, the control unit 111 of the first mobile terminal 100a sets a decision scheme for a forced leave to room-chair authority (S501).

During PTT conversation between mobile terminals in the PTT chat-room mode (S203), the control unit 111 of the first mobile terminal 100a receives a key signal for a forced leave (S505).

The control unit 111 of the first mobile terminal 100a receives a signal specifying a member, for example, a second mobile terminal 100b (S507). The control unit 111 of the first mobile terminal 100a controls the PTT module 113 to send a request for a forced leave of the specified member to the PTT server 170 (S509).

The PTT server 170 identifies a mobile terminal to be forced to leave according to the forced leave request, and stores information on the second mobile terminal 100b (S511). In this embodiment, the information on a member to be forced to leave is stored at the PTT server 170, unlike the first embodiment where the same information is stored in the memory unit 105 of the first mobile terminal 100a.

The PTT server 170 notifies the second mobile terminal 100b of a forced leave and releases the PTT connection to the second mobile terminal 100b (S513). Thereby, the second mobile terminal 100b terminates the PTT chat-room conversation (S515).

The PTT server 170 sends a notification of a forced leave of the second mobile terminal 100b to other mobile terminals 100a and 100c in PTT chat-room conversation (S517 and S519, respectively).

Later, when the second mobile terminal 100b placed on a forced leave sends a request for a PTT chat-room conversation to the PTT server 170 (S521), the PTT server 170 compares information regarding the second mobile terminal 100b requesting a PTT chat-room conversation with stored information regarding a mobile terminal placed on a forced leave (S523).

Through the comparison, the PTT server 170 recognizes that the second mobile terminal 100b has been placed on a forced leave, and rejects the request for a PTT chat-room conversation from the second mobile terminal 100b (S525).

As described above, the room chair can force a disruptive member to leave a PTT chat room, and the PTT server can reject a join request from a member placed on a forced leave. Thus, it is possible to more smoothly run a PTT chat room in a manner fitting for the purpose.

Figure 7A:
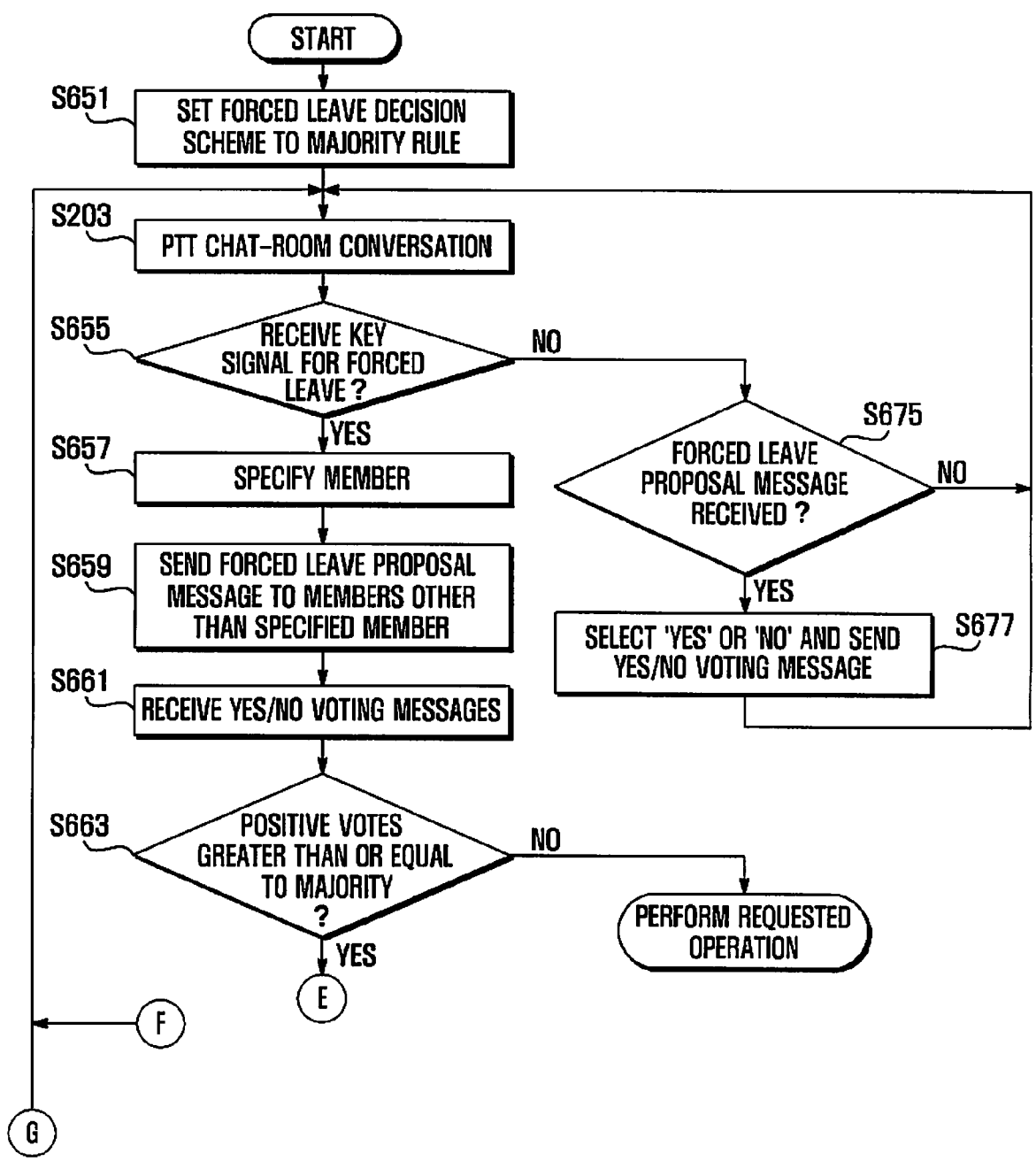
FIGS. 7A to 7B illustrate operations of a mobile terminal for the communication in FIGS. 6A to 6B.
Figure 7B:
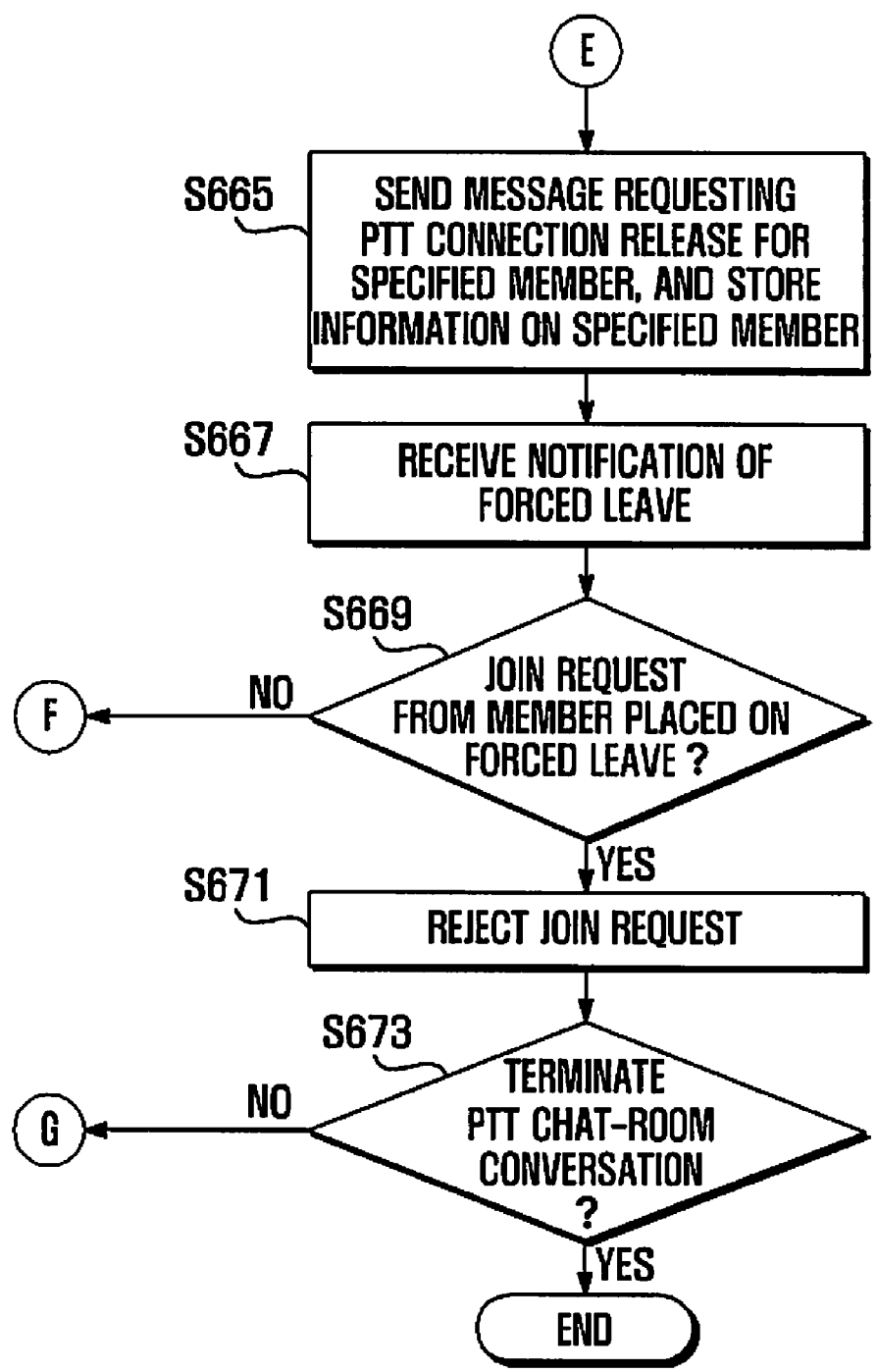

Next, a third embodiment of the PTT communication method is described. Descriptions of elements the same as or corresponding to those of the first and second embodiments are omitted. FIG. 6A to 6B are sequence diagrams illustrating a third embodiment of the PTT communication method of FIG. 2B, and FIGS. 7A to 7B illustrate operations of a mobile terminal for the communication in FIGS. 6A to 6B.

The third embodiment is similar to the first embodiment; however, the decision scheme for a forced leave is majority rule. In this embodiment, a first mobile terminal 100a creates a PTT chat room and sends a message requesting a forced leave.

Referring to FIGS. 1, 2A, 6A and 6B, the third embodiment of the PTT communication method is described in connection with the PTT system including mobile terminals and PTT server 170.

Referring to FIGS. 6A to 6B, the control unit 111 of the first mobile terminal 100a sets a decision scheme for a forced leave to majority rule (S601). To force a specified member to leave a PTT chat room under majority rule, the forced leave proposal is put to a vote of members in PTT chat-room conversation except for the specified member, and the specified member can be forced to leave by a majority of voters.

During PTT conversation between mobile terminals in the PTT chat-room mode (S203), the control unit 111 of the first mobile terminal 100a receives a key signal for a forced leave (S605).

The control unit 111 of the first mobile terminal 100a receives a signal specifying a member, for example, a second mobile terminal 100b (S607). The control unit 111 of the first mobile terminal 100a controls the PTT module 113 to send a request for a forced leave of the specified member to the PTT server 170 (S609).

The PTT server 170 identifies the second mobile terminal 100b to be forced to leave according to the forced leave request (S611), and sends a forced leave proposal message to third mobile terminals 100c in PTT chat-room conversation except for the second mobile terminal 100b (S613). The third mobile terminals 100c are mobile terminals in PTT chat-room conversation except for the first mobile terminal 100a requesting a forced leave and the second mobile terminal 100b being specified as a target for the forced leave.

Upon reception of the forced leave proposal message, each third mobile terminal 100c casts a positive or negative vote on the forced leave proposal (S615). Upon reception of a forced leave proposal message, each third mobile terminal 100c displays the received message as a pop-up on the display unit 103, and the user selects one of 'yes' and 'no' choices about the forced leave proposal.

The third mobile terminals 100c send their yes/no voting messages to the PTT server 170 (S617). The PTT server 170 forwards the yes/no voting messages to the first mobile terminal 100a, which has proposed a forced leave (S619).

The first mobile terminal 100a receives the yes/no voting messages (S621), and the control unit 111 thereof checks whether the number of positive votes is greater than or equal to a majority of voters (S623). The control unit 111 counts the number of members in PTT chat-room conversation as well as the number of positive votes in the received yes/no voting messages, and checks whether the counted number of positive votes is greater than or equal to a majority of members in PTT chat-room conversation. Simple majority voting is described in this embodiment, and other forms of voting may also be used.

If the number of positive votes is greater than or equal to a majority of voters, the control unit 111 of the first mobile terminal 100a stores information on the specified member, such as a phone number or address of the second mobile terminal 100b, in the memory unit 105 (S625).

The control unit 111 of the first mobile terminal 100a controls the PTT module 113 to send a request for a forced leave of the specified member to the PTT server 170 (S627). The PTT server 170 notifies the second mobile terminal 100b of a forced leave and releases the PTT connection to the second mobile terminal 100b (S629).

Thereby, the second mobile terminal 100b terminates the PTT chat-room conversation (S631). The PTT server 170 sends a notification of a forced leave of the second mobile terminal 100b to other mobile terminals 100a and 100c in PTT chat-room conversation (S633 and S635).

Later, when the second mobile terminal 100b placed on a forced leave sends a request for a PTT chat-room conversation to the PTT server 170 (S637), the PTT server 170 then forwards the request to the first mobile terminal 100a (S639).

The control unit 111 of the first mobile terminal 100a compares information regarding the second mobile terminal 100b requesting a PTT chat-room conversation with stored information regarding a mobile terminal placed on a forced leave (S641).

Through the comparison, the control unit 111 of the first mobile terminal 100a recognizes that the second mobile terminal 100b has been placed on a forced leave, and sends a message rejecting the request to the PTT server 170 (S643). The PTT server 170 sends a notification of rejection of the request to the second mobile terminal 100b (S645).

If the number of positive votes is less than a majority of voters at step S623, the control unit 111 of the first mobile terminal 100a sends a message notifying rejection of the forced leave proposal to those mobile terminals casting a positive vote. That is, the second mobile terminal 100b is not forced to leave because the number of positive votes is less than a majority of voters.

Next, referring to FIGS. 7A to 7B, the operation of the mobile terminal 100 according to the embodiment of FIGS. 6A to 6B is described in more detail. The control unit 111 sets a decision scheme for a forced leave to majority rule in step S651. The control unit 111 sets a PTT chat-room mode in a previously described manner in step S203.

During PTT conversation in the PTT chat-room mode, the control unit 111 checks whether a key signal for a forced leave is received in step S655. The user may input a special key to send a message requesting a forced leave to members in PTT chat-room conversation.

If a key signal for a forced leave is received, the control unit 111 receives a signal specifying a member in step S657. In response to input of the preset key, the control unit 111 requests the user to select a member to be forced to leave in a displayed list of members in PTT chat-room conversation.

The control unit 111 sends a forced leave proposal message to other members in PTT chat-room conversation except for the specified member in step S659. The forced leave proposal message may be pre-stored in the memory unit 105, or may be directly composed by the user through a message composition window displayed upon input of a key signal and member identifier for a forced leave at steps S655 and S657. The user may enter a reason for the forced leave in the forced leave proposal message.

Thereafter, the control unit 111 receives yes/no voting messages in reply to the forced leave proposal message in step S661. The control unit 111 checks whether the number of positive votes is greater than or equal to a majority of members in PTT chat-room conversation in step S663.

If the number of positive votes is below a majority of members, the control unit 111 performs an operation according to a user input. For example, the control unit 111 may return to step S655 for a forced leave, or to step S203 to continue the PTT chat-room conversation.

If the number of positive votes is greater than or equal to a majority of members, the control unit 111 sends to the PTT server 170 a message requesting release of the PTT connection to the specified member and stores information on the specified member, such as a mobile phone number or address, in the memory unit 105 in step S665.

The control unit 111 receives a notification of a forced leave of the specified member in step S667. The control unit 111 checks whether a member placed on a forced leave sends a join request in step S669. If a member placed on a forced leave sends a join request, the control unit 111 rejects the join request in step S671.

When a termination request for the PTT chat-room conversation is issued in step S673, the control unit 111 terminates the PTT chat-room conversation.

If a key signal for a forced leave is not received at step S655, the control unit 111 checks whether a forced leave proposal message is received from another member in step S675. Other members in PTT chat-room conversation may desire to force a particular member to leave the chat room.

If a forced leave proposal message is received, the control unit 111 selects a 'yes' or 'no' choice to send a yes/no voting message in step S677. This permits decision on a forced leave proposal issued by another member.

As described above, the present embodiment can force a disruptive member to leave a PTT chat room under majority rule, and reject a join request from a member placed on a forced leave. Thus, it is possible to more smoothly run a PTT chat room in a manner fitting for the purpose.

Figure 8A:
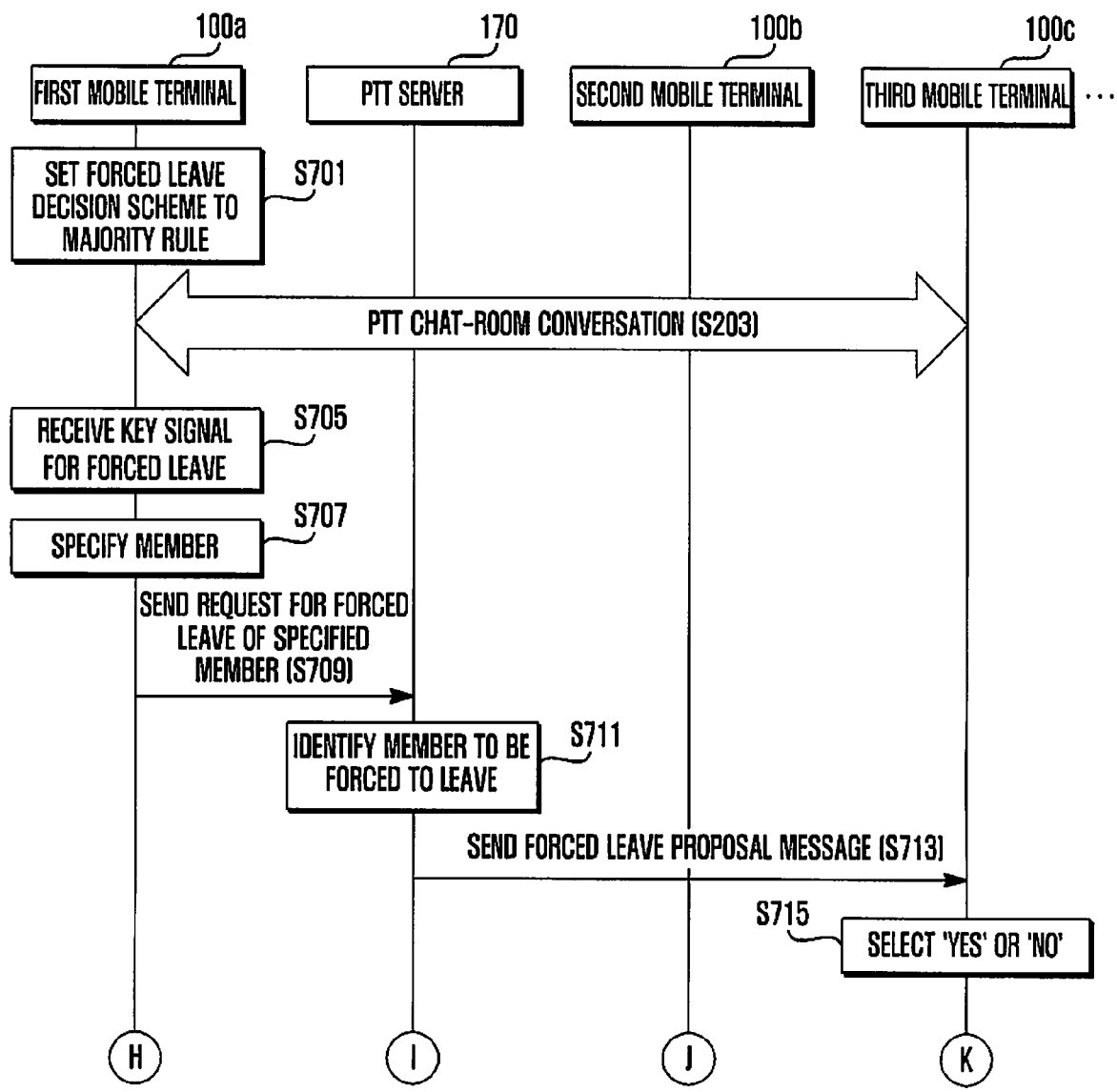
FIGS. 8A to 8B are sequence diagrams illustrating a fourth embodiment of the PTT communication method of FIG. 2B.
Figure 8B:
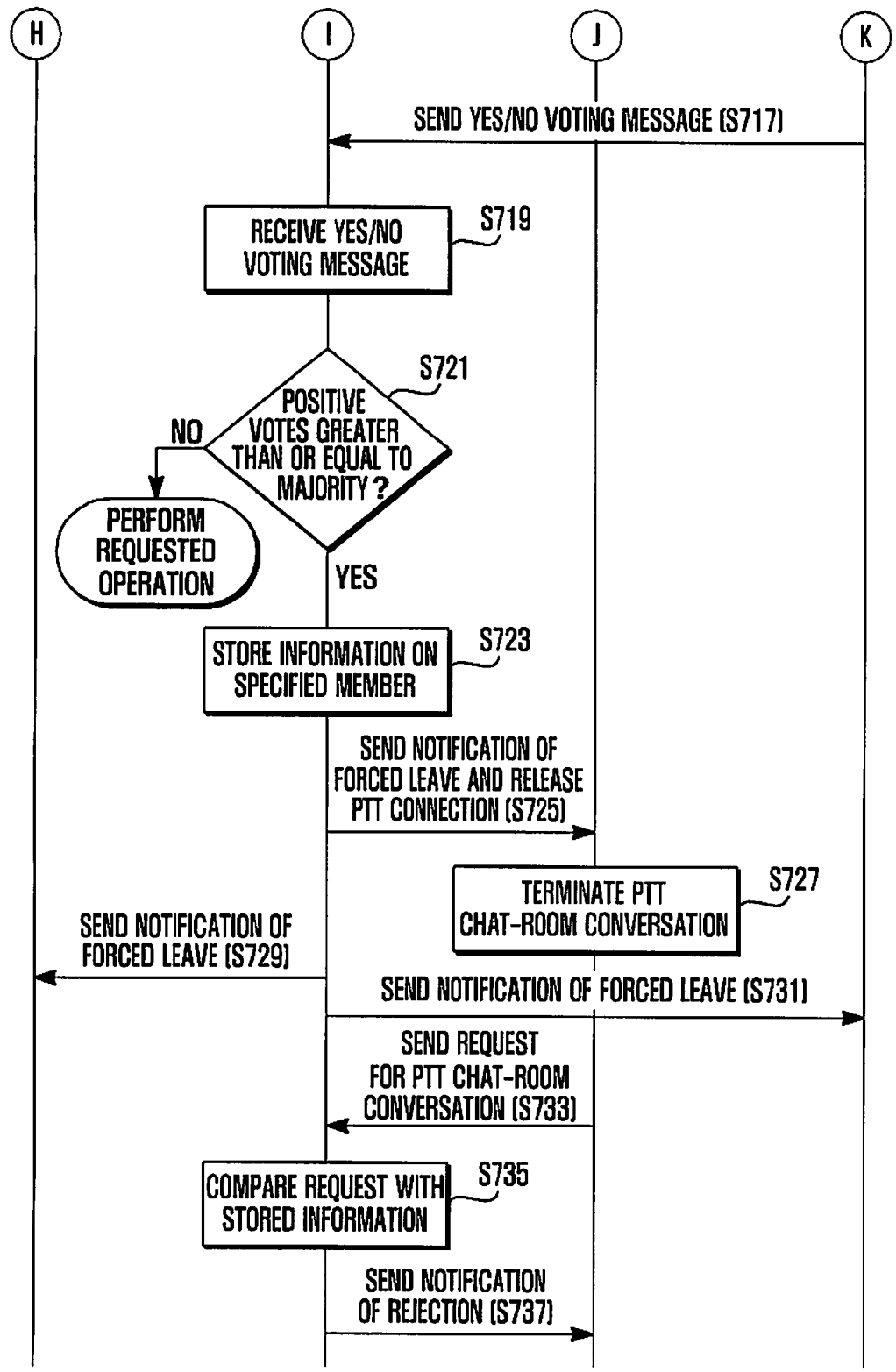

Next, a fourth embodiment of the PTT communication method is described. Descriptions of elements the same as or corresponding to those of the first to third embodiments are omitted. FIGS. 8A to 8B are sequence diagrams illustrating a fourth embodiment of the PTT communication method.

The fourth embodiment of the method is similar to the third embodiment, but some steps performed by the mobile terminal 100 in the third embodiment are now performed by the PTT server 170 in the fourth embodiment. In this fourth embodiment, a first mobile terminal 100a creates a PTT chat room, and sends a message requesting a forced leave of a particular member.

Referring to FIGS. 8A to 8B, the control unit 111 of the first mobile terminal 100a sets a decision scheme for a forced leave to majority rule (S701).

During PTT conversation between mobile terminals in the PTT chat-room mode (S203), the control unit 111 of the first mobile terminal 100a receives a key signal for a forced leave (S705).

The control unit 111 of the first mobile terminal 100a receives a signal specifying a member, for example, a second mobile terminal 100b (S707). The control unit 111 of the first mobile terminal 100a controls the PTT module 113 to send a request for a forced leave of the specified member to the PTT server 170 (S709).

The PTT server 170 identifies a mobile terminal to be forced to leave according to the forced leave request (S711), and sends a forced leave proposal message to third mobile terminals 100c in PTT chat-room conversation except for the second mobile terminal 100b (S713).

Upon reception of a forced leave proposal message, each third mobile terminal 100c selects one of 'yes' and 'no' choices about the forced leave proposal (S715), and sends a yes/no voting message to the PTT server 170 (S717).

The PTT server 170 receives the yes/no voting messages (S719), and checks whether the number of positive votes is greater than or equal to a majority of voters (S721). The PTT server 170 counts the number of members in PTT chat-room conversation and the number of positive votes in the received yes/no voting messages, and checks whether the counted number of positive votes is greater than or equal to a majority of members in PTT chat-room conversation.

If the number of positive votes is greater than or equal to a majority of voters, the PTT server 170 stores information on the specified member, the second mobile terminal 100b (S723). The PTT server 170 notifies the second mobile terminal 100b of a forced leave and releases the PTT connection to the second mobile terminal 100b (S725).

Thereby, the second mobile terminal 100b terminates the PTT chat-room conversation (S727). The PTT server 170 sends a notification of a forced leave of the second mobile terminal 100b to other mobile terminals 100a and 100c in PTT chat-room conversation (S729 and S731, respectively).

Later, when the second mobile terminal 100b placed on a forced leave sends a request for a PTT chat-room conversation to the PTT server 170 (S733), the PTT server 170 compares information regarding the second mobile terminal 100b requesting a PTT chat-room conversation with stored information regarding a mobile terminal placed on a forced leave (S735).

Through the comparison, the PTT server 170 recognizes that the second mobile terminal 100b has been placed on a forced leave, and sends a message rejecting the request to the PTT server 170 (S737).

As described above, the present embodiment can force a disruptive member to leave a PTT chat room under majority rule, and can reject a join request from a member placed on a forced leave. Thus, it is possible to more smoothly run a PTT chat room in a manner fitting for the purpose.

Although preferred embodiments of the present invention have been described in detail hereinabove, it should be understood that many variations and modifications of the basic inventive concept herein described, which may appear to those skilled in the art, will still fall within the spirit and scope of the preferred embodiments of the present invention as defined in the appended claims.

What is claimed is:

1. A Push-To-Talk (PTT) communication method comprising:
   having, by multiple mobile terminals, a PTT conversation with each other in a PTT chat-room;
   requesting, by a first mobile terminal after specifying a second mobile terminal as a target for a forced leave of a PTT server, a forced leave of the second mobile terminal;
   storing, by the first mobile terminal, information on the second mobile terminal to be forced to leave according to the forced leave request; and
   forcing, by the PTT server, the second mobile terminal to leave the PTT chat-room.

2. The PTT communication method of claim 1, wherein requesting of the PTT server for the forced leave further comprises:
   sending, by the first mobile terminal, a proposal message to the PTT server for a vote on a forced leave of the second mobile terminal;
   forwarding, by the PTT server, the proposal message to mobile terminals in a PTT chat-room conversation except for the second mobile terminal;
   receiving, by the PTT server, voting messages from those mobile terminals in the PTT chat-room conversation, and forwarding the received voting messages to the first mobile terminal; and
   storing, by the first mobile terminal, information on the second mobile terminal, when the number of positive votes is greater than or equal to a preset value.

3. The PTT communication method of claim 1, further comprising:
   receiving, by the PTT server after the second mobile terminal is placed on a forced leave, a join request for the PTT chat-room from the second mobile terminal, and forwarding the join request to the first mobile terminal;
   sending, by the first mobile terminal, a notification of rejection of the join request to the PTT server; and
   rejecting, by the PTT server, the join request from the second mobile terminal.

4. The PTT communication method of claim 2, further comprising:
   receiving, by the PTT server after the second mobile terminal is placed on a forced leave, a join request for the PTT chat-room from the second mobile terminal, and forwarding the join request to the first mobile terminal;
   sending, by the first mobile terminal, a notification of rejection of the join request to the PTT server; and
   rejecting, by the PTT server, the join request from the second mobile terminal.

5. The PTT communication method of claim 1, wherein the first mobile terminal forwards, upon reception of a proposal message from another mobile terminal for a forced leave of the second mobile terminal during the PTT chat-room conversation, the proposal message to the PTT server for a vote.

6. The PTT communication method of claim 2, further comprising:
   receiving, by the first mobile terminal during the PTT chat-room conversation, a proposal message from another mobile terminal for a vote on a forced leave of the second mobile terminal; and
   sending, by the first mobile terminal, a voting message including a 'yes' or 'no' choice on the forced leave of the second mobile terminal to the PTT server.

7. The PTT communication method of claim 1, wherein requesting to the PTT server for a forced leave comprises sending, by the first mobile terminal, information on the second mobile terminal to the PTT server, and further wherein forcing the second mobile terminal to leave further comprises storing, by the PTT server, the information on the second mobile terminal.

8. The PTT communication method of claim 1, wherein forcing the second mobile terminal to leave further comprises:
   sending, by the first mobile terminal, a proposal message to the PTT server for a vote on a forced leave of the second mobile terminal;
   forwarding, by the PTT server, the proposal message to mobile terminals in a PTT chat-room conversation except for the second mobile terminal;
   receiving, by the PTT server, voting messages from those mobile terminals in the PTT chat-room conversation, and storing, when the number of positive votes is greater than or equal to a preset value, information on the second mobile terminal.

9. The PTT communication method of claim 7, further comprising:
   receiving, by the PTT server after the second mobile terminal is placed on a forced leave, a join request for the PTT chat-room from the second mobile terminal; and
   rejecting, by the PTT server, the join request from the second mobile terminal.

10. The PTT communication method of claim 8, further comprising:
    receiving, by the PTT server after the second mobile terminal is placed on a forced leave, a join request for the PTT chat-room from the second mobile terminal; and
    rejecting, by the PTT server, the join request from the second mobile terminal.

11. The PTT communication method of claim 1, wherein requesting of the PTT server for the forced leave further comprises:
    displaying, by the first mobile terminal, a list of mobile terminals in a PTT chat-room conversation in response to reception of a key signal for a forced leave; and
    selecting the second mobile terminal from the displayed list as a target for the forced leave.

12. A Push-To-Talk (PTT) communication system comprising:
    a plurality of mobile terminals including a first mobile terminal creating a PTT chat room for a PTT conversation and a second mobile terminal specified as a target for a forced leave,
    wherein when the first mobile terminal specifies the second mobile terminal as a target for a forced leave, the first mobile terminal stores information on the second mobile terminal to be forced to leave according to a forced leave request; and
    a PTT server forcing, upon reception of a request from the first mobile terminal for the forced leave of the second mobile terminal, the second mobile terminal to leave the PTT chat-room.

13. The PTT communication system of claim 12, wherein the first mobile terminal specifies the second mobile terminal as a target for a forced leave during a PTT chat-room conversation, sends a proposal message to the PTT server for a vote on a forced leave of the second mobile terminal, and receives voting messages from the PTT server and stores, when the number of positive votes is greater than or equal to a preset value, information on the second mobile terminal, and further wherein the PTT server forwards the proposal message from the first mobile terminal to mobile terminals in a PTT chat-room conversation except for the second mobile terminal, and forwards the voting messages from the mobile terminals in the PTT chat-room conversation to the first mobile terminal.

14. The PTT communication system of claim 12, wherein when a join request for the PTT chat-room is received from the second mobile terminal after the second mobile terminal is placed on the forced leave, the PTT server forwards the join request to the first mobile terminal, and rejects the join request when a notification of rejection of the join request is received from the first mobile terminal.

15. The PTT communication system of claim 13, wherein when a join request for the PTT chat-room is received from the second mobile terminal after the second mobile terminal is placed on the forced leave, the PTT server forwards the join request to the first mobile terminal, and rejects the join request when a notification of rejection of the join request is received from the first mobile terminal.

16. The PTT communication system of claim 12, wherein the first mobile terminal forwards a proposal message to the PTT server for a vote, upon reception of the proposal message from another mobile terminal for a forced leave of the second mobile terminal during the PTT chat-room conversation.

17. The PTT communication system of claim 13, wherein when a proposal message for a vote on the forced leave of the second mobile terminal is received from another mobile terminal during the PTT chat-room conversation, the first mobile terminal sends a voting message including a 'yes' or 'no' choice on the forced leave to the PTT server.

18. The PTT communication system of claim 12, wherein when the second mobile terminal is specified as a target for a forced leave, the first mobile terminal sends information on the second mobile terminal to the PTT server and the PTT server stores the information on the second mobile terminal.

19. The PTT communication system of claim 12, wherein the first mobile terminal specifies the second mobile terminal as a target for a forced leave during a PTT chat-room conversation, and sends a proposal message to the PTT server for a vote on a forced leave of the second mobile terminal, and further wherein the PTT server forwards the proposal message from the first mobile terminal to mobile terminals in a PTT chat-room conversation except for the second mobile terminal, receives voting messages from the mobile terminals, and stores, when the number of positive votes is greater than or equal to a preset value, information on the second mobile terminal.

20. The PTT communication system of claim 18, wherein when a join request for the PTT chat-room is received from the second mobile terminal after the second mobile terminal is placed on a forced leave, the PTT server rejects the join request from the second mobile terminal.

21. The PTT communication system of claim 19, wherein when a join request for the PTT chat-room is received from the second mobile terminal after the second mobile terminal is placed on a forced leave, the PTT server rejects the join request from the second mobile terminal.

22. The PTT communication system of claim 12, wherein the first mobile terminal displays, in response to reception of a key signal for a forced leave, a list of mobile terminals in a PTT chat-room conversation, and selects the second mobile terminal from the displayed list as a target for the forced leave.

* * * * *